(12) United States Patent
Hjørnet

(10) Patent No.: US 8,560,121 B2
(45) Date of Patent: Oct. 15, 2013

(54) VACUUM GRIPPING APPARATUS

(71) Applicant: Preben K. Hjørnet, Strandby (DK)

(72) Inventor: Preben K. Hjørnet, Strandby (DK)

(73) Assignee: Adept Technology, Inc., Pleasanton, CA (US)

( * ) Notice: Subject to any disclaimer, the term of this patent is extended or adjusted under 35 U.S.C. 154(b) by 0 days.

(21) Appl. No.: 13/649,957

(22) Filed: Oct. 11, 2012

(65) Prior Publication Data

US 2013/0034420 A1  Feb. 7, 2013

Related U.S. Application Data

(63) Continuation of application No. 12/597,307, filed as application No. PCT/US2008/005330 on Apr. 25, 2008, now Pat. No. 8,290,624.

(60) Provisional application No. 60/926,329, filed on Apr. 26, 2007.

(51) Int. Cl.
| | | |
|---|---|---|
| *B25J 5/06* | (2006.01) | |
| *B25J 19/02* | (2006.01) | |
| *B25J 9/00* | (2006.01) | |
| *B65B 35/18* | (2006.01) | |

(52) U.S. Cl.
USPC ............ 700/259; 198/468.4; 198/750.12; 414/737; 901/40

(58) Field of Classification Search
USPC ............ 198/468.4, 750.12; 294/65, 183, 185, 294/189; 414/627, 737; 700/245–264; 901/40
See application file for complete search history.

(56) References Cited

U.S. PATENT DOCUMENTS

| | | | | |
|---|---|---|---|---|
| 3,165,899 | A | * | 1/1965 | Shatto, Jr. ............... 405/191 |
| 3,174,789 | A | | 3/1965 | Scherr |
| 3,602,543 | A | * | 8/1971 | Sjodin ..................... 294/189 |
| 3,993,301 | A | * | 11/1976 | Vits .......................... 271/98 |
| 4,078,671 | A | * | 3/1978 | Lundstrom ............. 414/627 |
| 4,561,686 | A | | 12/1985 | Atchley |
| 4,582,353 | A | | 4/1986 | Alvernhe |

(Continued)

FOREIGN PATENT DOCUMENTS

| | | |
|---|---|---|
| DE | 1200196 | 9/1965 |
| DE | 4129289 | 3/1992 |

(Continued)

OTHER PUBLICATIONS

International Search Report issued in corresponding International application No. PCT/US2008/005330, mailed Nov. 21, 2008.

(Continued)

*Primary Examiner* — Khoi Tran
*Assistant Examiner* — Dale Moyer
(74) *Attorney, Agent, or Firm* — Law Offices of Grady L. White, LLC

(57) ABSTRACT

A gripper grasps irregular and deformable work pieces so as to lift and hold packaged, processed, or raw, and manipulate the work pieces for the purpose of material handling, assembly, packaging, and other robotic and automated manipulative functions. A vacuum is induced at multiple points through a flexible gripping hood to provide lifting force to, and facilitate rapid movement of, work pieces. An array of lighting devices and a double ring array of segmented mirrors provide uniform illumination to ensure accurate positioning of the gripping hood with respect to the work piece to be manipulated.

16 Claims, 8 Drawing Sheets

(56) References Cited

U.S. PATENT DOCUMENTS

| | | | |
|---|---|---|---|
| 4,921,520 A * | 5/1990 | Carlomagno | 65/111 |
| 5,149,162 A | 9/1992 | Focke et al. | |
| 5,169,196 A * | 12/1992 | Safabakhsh | 294/64.3 |
| 5,174,021 A * | 12/1992 | L'Esperance et al. | 29/840 |
| 5,190,332 A | 3/1993 | Nagai et al. | |
| 5,191,218 A | 3/1993 | Mori et al. | |
| 5,192,070 A | 3/1993 | Nagai et al. | |
| 5,213,385 A | 5/1993 | Nagai et al. | |
| 5,219,264 A | 6/1993 | McClure et al. | |
| 5,388,879 A | 2/1995 | Sekiguchi et al. | |
| 5,416,392 A | 5/1995 | Lee et al. | |
| 5,503,519 A | 4/1996 | Schwetz et al. | |
| 5,724,722 A | 3/1998 | Hashimoto | |
| 5,865,827 A | 2/1999 | Bullister | |
| 5,904,387 A | 5/1999 | Nagai et al. | |
| 5,995,646 A | 11/1999 | Yonezawa et al. | |
| 6,024,392 A | 2/2000 | Blatt | |
| 6,102,459 A | 8/2000 | Pabst et al. | |
| 6,123,502 A | 9/2000 | Adams et al. | |
| 6,182,957 B1 | 2/2001 | Becker | |
| 6,193,291 B1 | 2/2001 | Morroney | |
| 6,236,904 B1 | 5/2001 | Nakamura | |
| 6,279,976 B1 | 8/2001 | Ball | |
| 6,349,245 B1 | 2/2002 | Finlay | |
| 6,367,855 B1 | 4/2002 | Schmalz et al. | |
| 6,382,692 B1 | 5/2002 | Schmalz et al. | |
| 6,419,291 B1 | 7/2002 | Preta | |
| 6,425,565 B1 | 7/2002 | Montague | |
| 6,431,623 B1 | 8/2002 | Roeters et al. | |
| 6,437,560 B1 | 8/2002 | Kalb | |
| 6,454,517 B1 | 9/2002 | Ohno | |
| 6,502,877 B2 | 1/2003 | Schick et al. | |
| 6,817,639 B2 | 11/2004 | Schmalz et al. | |
| 6,979,032 B2 | 12/2005 | Damhuis et al. | |
| 6,994,386 B2 | 2/2006 | Hagmann et al. | |
| 7,161,322 B2 | 1/2007 | Wang et al. | |
| 7,164,968 B2 | 1/2007 | Treat et al. | |
| 7,240,935 B2 | 7/2007 | Schmierer et al. | |
| 7,261,350 B2 | 8/2007 | Isetani et al. | |
| 7,272,524 B2 | 9/2007 | Brogrdh | |
| 7,412,863 B2 | 8/2008 | Akami et al. | |
| 7,546,678 B2 | 6/2009 | Asai et al. | |
| 7,568,747 B2 | 8/2009 | Difford | |
| 7,610,785 B2 | 11/2009 | Akami et al. | |
| 7,643,905 B2 | 1/2010 | Watanabe et al. | |
| 7,677,622 B2 | 3/2010 | Dunkmann et al. | |
| 7,712,806 B2 | 5/2010 | Adachi | |
| 7,726,715 B2 | 6/2010 | Nagasawa et al. | |
| 8,037,918 B2 * | 10/2011 | Wang et al. | 156/538 |
| 8,262,146 B2 * | 9/2012 | Stoppel | 294/183 |
| 2002/0011735 A1 | 1/2002 | Nagai et al. | |
| 2002/0031424 A1 | 3/2002 | Nakajima | |
| 2002/0145296 A1 | 10/2002 | Doornekamp | |
| 2003/0072645 A1 | 4/2003 | Murray et al. | |
| 2003/0115747 A1* | 6/2003 | Schnetzler et al. | 29/830 |
| 2005/0168001 A1 | 8/2005 | Perlman et al. | |
| 2005/0193451 A1 | 9/2005 | Quistgaard et al. | |
| 2008/0075574 A1 | 3/2008 | Ahn et al. | |
| 2008/0213077 A1 | 9/2008 | Tanaka et al. | |
| 2008/0226436 A1 | 9/2008 | Denkmeier et al. | |
| 2008/0253612 A1 | 10/2008 | Reyier et al. | |
| 2008/0302200 A1 | 12/2008 | Tobey | |
| 2009/0005907 A1 | 1/2009 | Kronenberg | |
| 2009/0019715 A1 | 1/2009 | Engles | |
| 2009/0055024 A1 | 2/2009 | Kay | |
| 2009/0076655 A1 | 3/2009 | Blondel et al. | |
| 2009/0093908 A1 | 4/2009 | Hashimoto et al. | |
| 2009/0182454 A1 | 7/2009 | Donoso et al. | |
| 2009/0196717 A1 | 8/2009 | Holden | |
| 2009/0222133 A1 | 9/2009 | Buckingham et al. | |
| 2009/0222134 A1 | 9/2009 | Franke et al. | |
| 2010/0066108 A1 | 3/2010 | Ostendarp et al. | |
| 2010/0080680 A1 | 4/2010 | Okamoto et al. | |
| 2010/0198402 A1 | 8/2010 | Greer et al. | |
| 2010/0222918 A1 | 9/2010 | Nonaka et al. | |
| 2010/0228388 A1 | 9/2010 | Ago et al. | |
| 2010/0234994 A1 | 9/2010 | Shi | |
| 2010/0245558 A1 | 9/2010 | Koike et al. | |
| 2010/0255195 A1 | 10/2010 | Lambert et al. | |
| 2010/0256818 A1 | 10/2010 | Aoba et al. | |

FOREIGN PATENT DOCUMENTS

| | | |
|---|---|---|
| DE | 4444960 A1 | 6/1996 |
| DE | 19817426 | 10/1999 |
| DE | 10335021 B3 | 11/2004 |
| DE | 202005007145 U1 | 9/2006 |
| EP | 1369364 A1 | 12/2003 |
| EP | 2183079 A1 | 5/2010 |
| FR | 2928855 A1 | 9/2009 |
| JP | 3086488 A | 4/1991 |
| WO | 88-01924 A1 | 3/1988 |
| WO | 2006-117114 | 11/2006 |

OTHER PUBLICATIONS

Supplementary European Search Report issued in corresponding EP Application No. 08754109, issued Sep. 21, 2010.

International Preliminary Report on Patentability issued in corresponding International application No. PCT/US2008/005330, on Oct. 27, 2009.

Written Opinion issued in corresponding International application No. PCT/US2008/005330, mailed on Nov. 21, 2008.

* cited by examiner

VACUUM GRIPPING APPARATUS

CROSS-REFERENCE TO RELATED APPLICATIONS

This application is a continuation of application Ser. No. 12/597,307 filed on Oct. 23, 2009 (issued on Oct. 16, 2012 as U.S. Pat. No. 8,290,624). That application is the U.S. National Stage entry of International Application PCT/US2008/005330, which was filed on Apr. 25, 2008 and which claimed priority based on U.S. Provisional Application Ser. No. 60/926,329 filed Apr. 26, 2007. The disclosure of each of application Ser. No. 12/597,307, PCT/US2008/005330, and Application Ser. No. 60/926,329 is incorporated herein by reference.

BACKGROUND

This disclosure relates to the field of grasping irregular and deformable work pieces so as to lift and to hold the work pieces, whether packaged, processed, or raw, and to manipulate the work pieces for the purpose of material handling, assembly, packaging, and other robotic and automated manipulative functions.

ISO defines industrial robots as automatically controlled, reprogrammable, multipurpose manipulators programmable in three or more axes. While motion control of industrial robots has reached a high level of sophistication and flexibility, difficulties relating to the most critical element of a robotic system, the end effector, or end-of-arm-tooling, have impeded adoption of industrial robots in many industry segments.

Common end effectors include welding devices, paint sprayers, grinders and deburring devices, and grippers. End effectors, and particularly the gripping types, are frequently highly complex, and highly customized to match the handled work piece. The end effectors may utilize various sensors to aid the robot system in locating, handling, and positioning products. However, technology has lagged in this area due to inherent difficulties in handling irregular objects and in producing gripping devices suited for a sufficiently wide variety of uses to generate the economies of scale required for widespread commercial adoption.

Many solutions have had inadequate software as well, leading to unforeseen side effects in attempting to manipulate natural products. Machine vision software, an important component to a successful industrial robot implementation, is often constrained by inadequate or irregular lighting encountered in real-world industrial environments. Thus, a better griping apparatus has been needed.

SUMMARY

The apparatus disclosed may grasp, lift, hold, pack, and move irregular and deformable work pieces such as vegetables, fruit, pork, poultry and meat or non-food items, whether processed or raw. The apparatus can manipulate bags for the purpose of material handling, assembly, packaging, and other robotic and automated manipulative functions. The apparatus can also grip wrapped or regularly formed objects with or without air-permeable wrappers or ventilation holes in the outer surface securing sufficient friction and holding forces to withstand extreme acceleration forces resulting from high-speed robotic handling.

The apparatus comprises a vacuum gripping device capable of being manipulated by a robotic arm and an optical system to provide information of positioning of the gripper. The gripper facilitates a sure, firm, but gentle grip that enables handling of a wide variety of work pieces of diverse size and shapes and their movement at rapid vertical and horizontal accelerations for efficient real-world packing operations.

By adaptive action, the apparatus distributes the gripper force uniformly over the maximum area of the encapsulated products. The apparatus incorporates a method for monitoring the function of vacuum handling tools in situ. The apparatus also facilitates automatic product handling capabilities for bagged products regardless of whether the packaging or work piece is totally or only partially filled.

The gripping device has a flexible hood mounted to a base plate. The hood includes a membrane and a circumferential lip. The gripping membrane is made of a soft material such as silicone or soft thermoplastic blend that enables it to conform to the irregular surface of the work piece so that a difference in air pressure between the surface of the work piece and the lip of the gripper will be generated. The hood may be molded by a thermoplastic sequential molding process where the lip of the hood is molded of a polymer with a higher melting temperature than the membrane polymer. Often, this is a cost efficient method and that provides good bonding between the lip-membrane and the base. Small, flexible tubes (vacuum channel fingers) are formed come through channels in the flexible gripping hood.

The base plate has large central hole to accommodate a vacuum line. Suction is generated at central hole at the top of the hood as well as through flexible tubes or fingers that extend along the wall of the hood to open ends that provide gripping force at multiple points closer to the edge of the hood. In food-related applications these tubes may be removed after molding leaving the channel open, but sufficiently rigid so as not to collapse when a high vacuum level is generated. This reduces the risk of delamination between the tube and the membrane and the concomitant possibility of dropping a foreign object in the work piece or packaging.

Airflow is initially introduced around the rim of the base plate. There is no airflow until the lip is positioned over the work piece. With approximately an 80% vacuum, a sufficient vacuum level can be created in about $1/10$ of one second. This creates a sudden shock on the work piece and lip of the gripper. Within about $5/100$ of a second, the work piece is trapped against the rim of the base plate. At that point, the air flow around the base plate is blocked and the only air flow is down the flexible tubes. This causes the lip of the gripper, being formed of flexible material, to deform to the shape of the work piece, making a tight connection at multiple points on the work piece.

At the point where the small gaps between the surface of the work piece and the attaching surface of the gripper membrane have been closed, there is usually no further need for high air flow and a reduced vacuum may typically be maintained at between 20 and 40 percent. Without low pressure around rim of lip, upon rapid movement of the work piece by the robotic apparatus, the work piece would break free from the vacuum. The large area on the gripper, comprising the central orifice and peripheral tubes, works like a normal set of suction cups. In most cases the work piece will be tight against the hood, affording a lifting capacity on the order of 20 to 100 kilograms for a gripper membrane with a rim area of approximately 300 $cm^2$. This large gripping force facilitates fast acceleration of the work piece by the robotic apparatus from the belt or work surface, thus significantly increasing overall efficiency of the material handling system.

Typically, the gripper is able to lift a work piece from a typical material conveyor belt within approximately $8/100$ of a second, often with a success rate of over 99% when applied to work pieces comprising strapped bags (those tied at one end). The gripper design may be optimized in different configurations for strapped bags or for the flatter pillow bags. In such optimization, the shape of the gripper lip is modified appropriately to match the approximate shape and lip length for different types of bags. A number of gripper configurations can be created for different families of bags used in standard packaging of consumer and industrial products. The system may be configured to allow ready customization by changing to the appropriate lip system for the type of packaging to be manipulated.

Three different techniques may be used to provide interactive control of the system. A height vacuum sensor positions the gripper. This sensor detects pressure on the plate providing control feedback for movement of the positioning arm. As previously indicated, the gap and membrane plus the flexible peripheral tubes provide a large area of distributed gripping surface. The system preferably provides a full grip before rapid movement of the work piece or the containing bag could rip. Compressed air may be forced back down the vacuum openings in the base plate or the flexible tubes for rapid release of the work piece after it has been moved. These positive pressure lines may reside inside the main movement arm.

To facilitate accurate positioning of the gripper with respect the work piece, the apparatus incorporates a unique lighting and camera system. A circular array of constant or strobe-able light sources is supported over a specific position on the path that brings work pieces to the robotic manipulation apparatus. To provide uniform lighting with the high contrast, while keeping the lighting array isolated from other components of system or contaminating influences, the array of light sources is directed downward and outward toward one or more mirror arrays. The mirror arrays align with the individual sources of the lighting array to reflect light downward and inward around the circumference of the work piece.

This illumination method typically provides uniformity of lighting and contrast. A digital camera positioned over the work path can then take one or more images of the work as it passes toward the robotic arm. Use of high speed stroboscopic lighting elements may produce sharp images even when the work pieces are in motion. An image captured by the camera may be stored in a computer. The apparatus incorporates a generic visual capture system that allows machine vision software to accurately and quickly locate bags on a platform or moving belt. Product shapes vary widely, so the system may be adapted to a wide variance in size, shape, texture, color, and other visual features.

The uniform lighting produces high-contrast digital images that can be compared with pre-stored images of model work pieces based on size, shape, packaging art, and other factors. The pre-stored image can be associated with an optimized gripping position for that particular type of work piece. Using visual image robotic control software, as is known in the art, the robotic arm can then position the gripper to grasp the work piece in the optimized position regardless of the orientation of the work piece on work path. This approach increases accuracy and speed and eliminates down time and damage to work pieces that result from errors in positioning.

BRIEF DESCRIPTION OF THE DRAWINGS

Other features and advantages of the present apparatus will be apparent from the following Detailed Description taken in conjunction with the accompanying Drawings, in which.

DETAILED DESCRIPTION

The present vacuum gripping apparatus is suitable for grasping irregular and deformable work pieces so as to lift and hold the work pieces, whether packaged, processed, or raw, and manipulate the work pieces for the purpose of material handling, assembly, packaging, and other robotic and automated manipulative functions. The apparatus also illuminates the work pieces for accurate positioning of the gripper with respect to the work piece.

The vacuum suction force is generated from a vacuum tank with electronically operated high speed and high vacuum flow valve that is connected through a hose to the gripper. The gripper assembly is moved using a robotic arm that can be controlled by a real-time computerized controller incorporating tactile and/or visual feedback to position the gripper on the work piece. The apparatus 100 includes a visual positioning system having machine vision software such as those known in the art.

Figure 1:
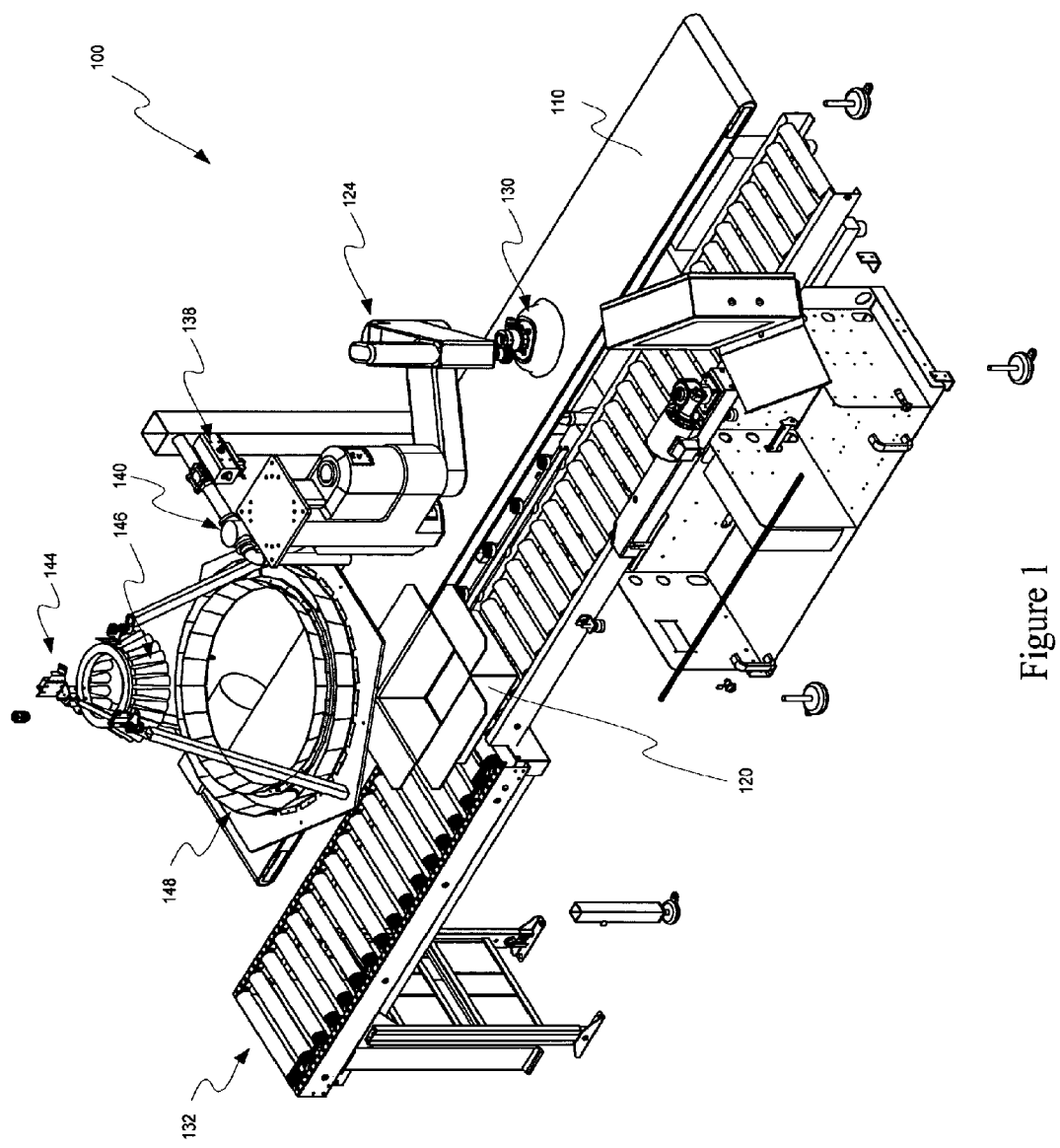
FIG. 1 depicts a first side perspective view of a packing system incorporating the apparatus.
Figure 1A:
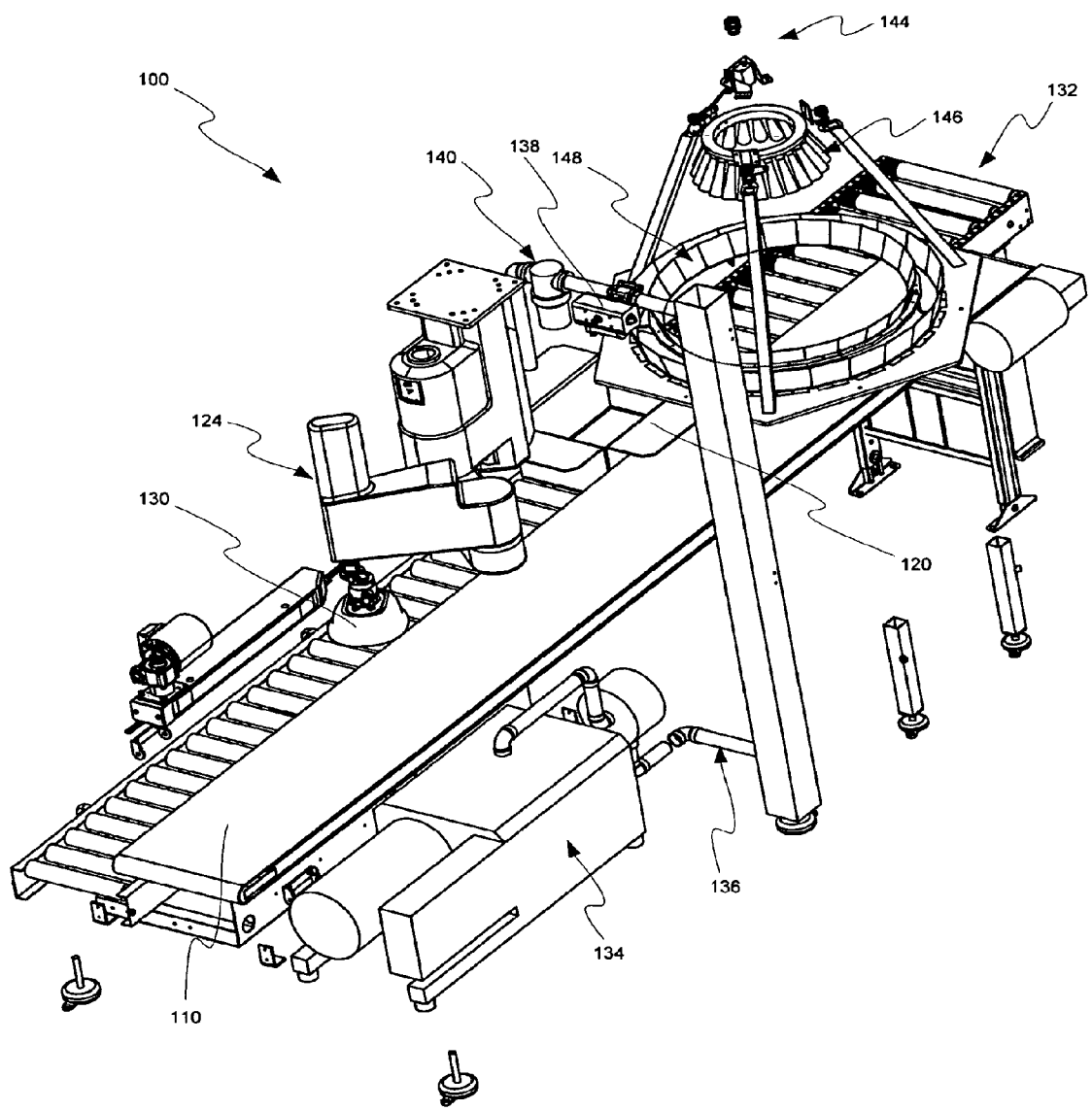
FIG. 1A depicts a second side perspective view of a packing system incorporating the apparatus.

FIGS. 1 and 1A depict a robotic materials handling apparatus 100. The apparatus has a supporting framework through which a conveyor or work surface 110 passes. Work pieces 114 are placed on, or transported along, the work surface. The apparatus 100 places the work pieces into containers 120 using a robotic arm 124 to which is mounted a gripping assembly 130. The gripping assembly lifts, manipulates, moves, and places the work pieces into the containers, and the containers may then be transported away from the apparatus along a conveyor track 132. The apparatus 100 includes a vacuum pump 134 for providing suction or vacuum force through a vacuum line 136 to the gripper assembly 130. The vacuum force in the vacuum line may be controlled by a valve 138, and the vacuum line may include a filter 140. A digital camera 144, an array of light sources 146, and a double array of reflective mirrors 148 are used to locate the work pieces on the work surface.

Figure 2:
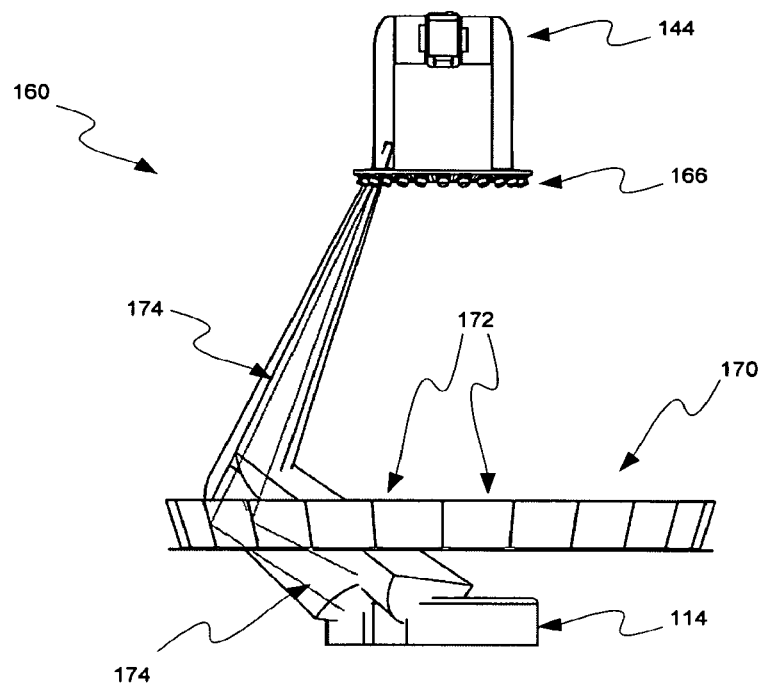
FIG. 2 depicts a side elevation view of an optical illumination and camera system incorporated into the apparatus of FIG. 1.
Figure 2A:
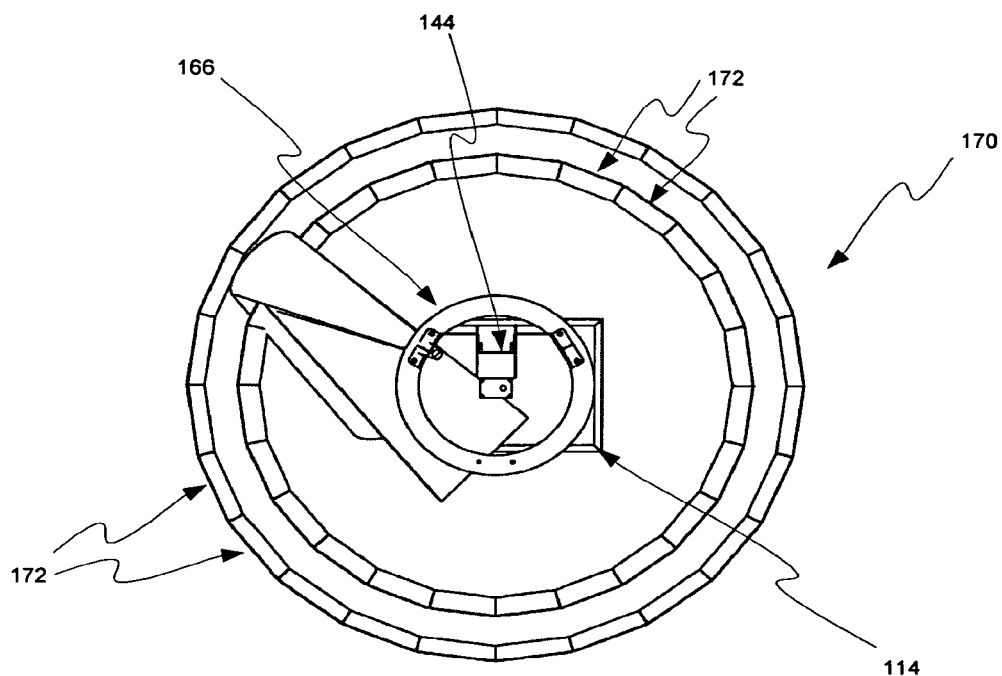
FIG. 2A depicts a top view of an optical illumination and camera system incorporated into the apparatus of FIG. 1.
Figure 2B:
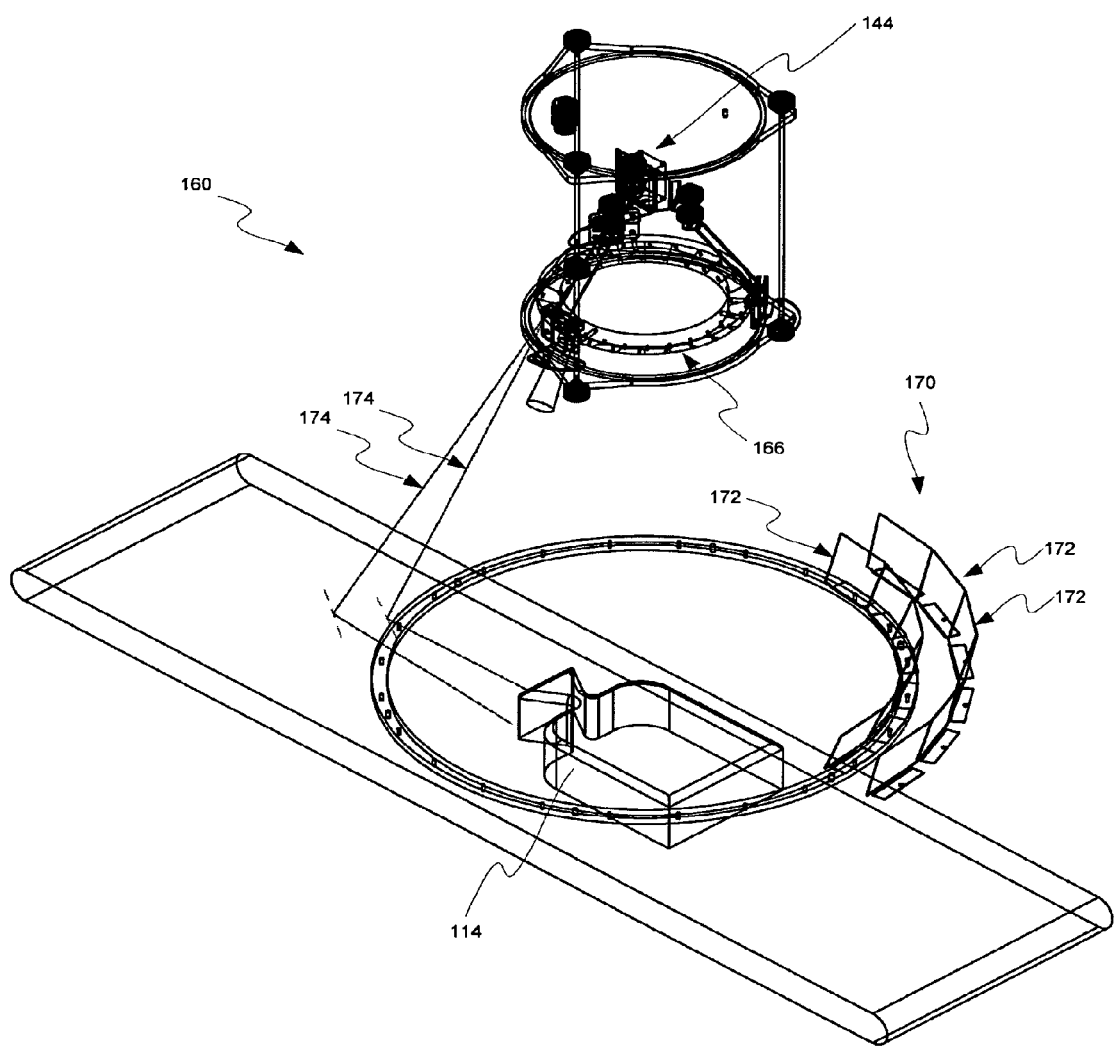
FIG. 2B depicts a wire frame perspective view of an optical illumination and camera system incorporated into the apparatus of FIG. 1.

FIGS. 2, 2A and 2B depict an optical illumination and camera system 160. A light source, such as ring of light emitting diodes (LEDs) 166 is mounted above the work surface 110. The LED array 166 may use different wavelength light from the ambient light for superior discrimination. The light wavelength may be varied to look for contrast between elements on the work piece (such as design elements on a bag or package), the rim of the work piece, and conveyor or work surface 110. The LED array and camera 144 may be placed into a sealed enclosure so that the system can work effectively in an environment that would otherwise be hostile to the optical system, such as the stream or spray of a cleaning system used on the work pieces during their manipulation or at intervals for cleaning or disinfecting as if required in food handling industries.

The visual system 160 employs two segmented rings 170 of mirrors 172. Light rays 174 from the LEDs 166 reflect from both rings to provide homogeneous illumination over a large height range of work pieces 114. Thus a static array of mirrors in the two ring configuration may provide a universal source of visual information that is captured by the camera in digital format for processing by machine vision software, as known in the art. While the number and positioning or angle of the mirrors in the array may be varied, an approximation works well so that the single optimized system can be maintained for a wide variety of uses, avoiding the prohibitive pricing of a system that is independently optimized for different uses. In providing an optimized system, the double ring configuration provides advantages over the prior art, including single one array configurations.

The mirrors 172 in the array are concentric and are aligned in height to avoid optical artifacts in illumination. Because bags or other work pieces 114 may rotate around a vertical axis, the system 160 provides lighting from all angles to produce the same image regardless of orientation. The mirror array 170 provides a generic solution largely independent of shape, size, bag design or graphics, and orientation of the work piece along the work path. The array also facilitates the use of the optical output with a wide range of machine vision software and systems as it does not overload the software with excess data outside of pre-programmed limitations. The mirrors 172 may be of stainless steel for use in a wide variety of environments where resistance to breakage or corrosion are factors.

Figure 3:
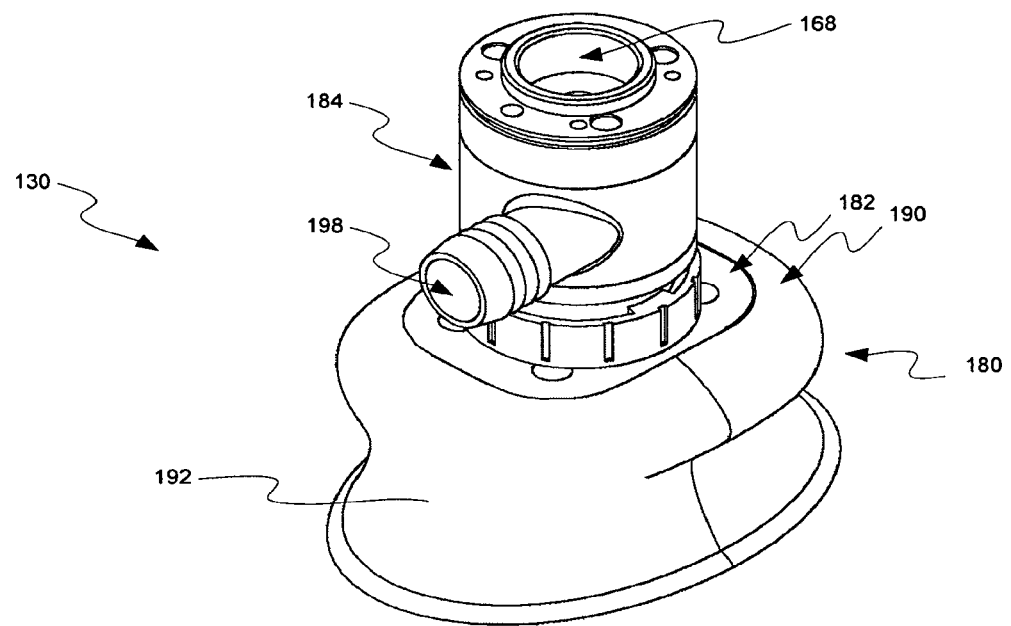
FIG. 3 depicts a top perspective view of a flexible gripping assembly and a swivel adapter for the apparatus shown in FIG. 1.
Figure 3A:
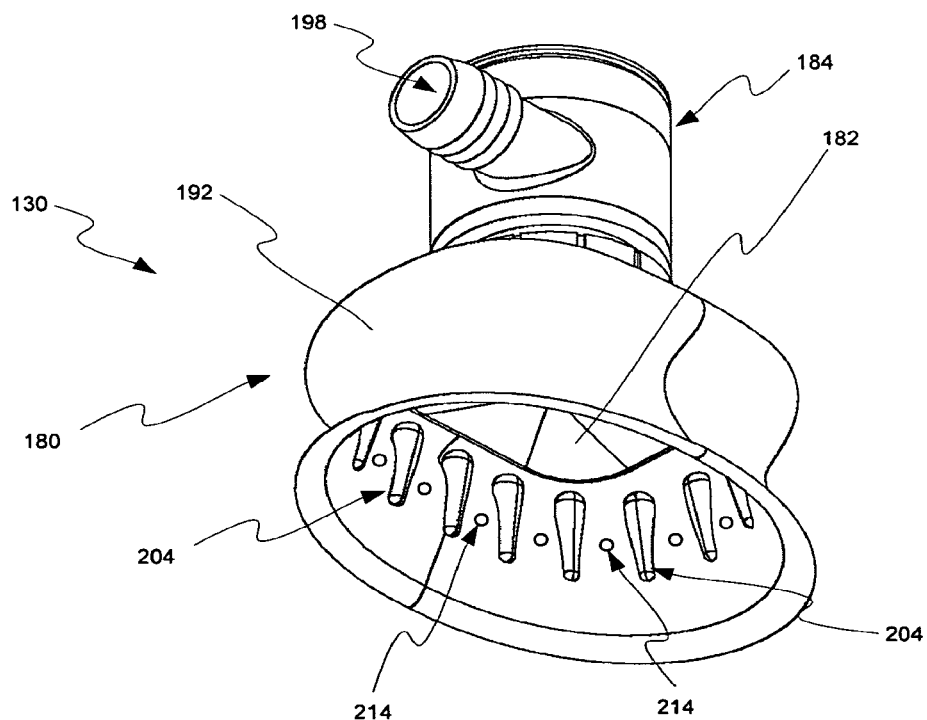
FIG. 3A depicts a bottom perspective view of the flexible gripping assembly and a swivel adapter shown in FIG. 3.
Figure 4:
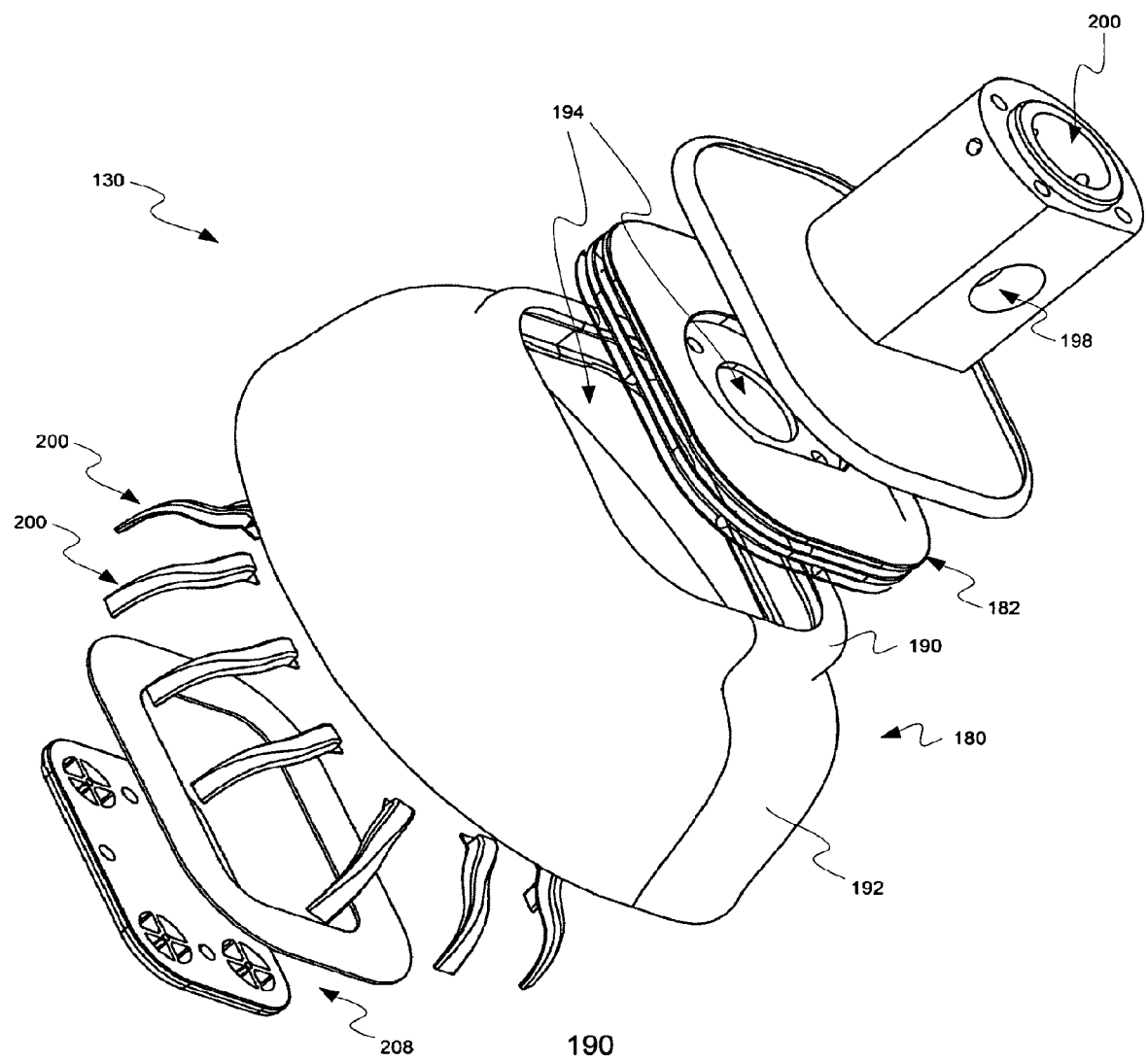
FIG. 4 depicts an exploded view of the gripper assembly.

FIGS. 3, 3A and 4 depict the flexible gripper assembly 130, which includes a flexible hood 180 mounted to a base plate 182. In one embodiment, a swivel adapter 184 is mounted between the base plate and a tool center attachment point 188. In one embodiment, the gripper hood 180 is produced using an overmolding process that allows previously molded parts to be reinserted and a new layer of material to form around the original part. This may be done by applying a thermoplastic sequential molding process where the lip 190 of the hood 180 is molded of a polymer with a higher melting temperature than the polymer used for the membrane 192 of the hood, as is known in the art to be a cost efficient method that provides a good bond between the lip-membrane and the base plate.

A central orifice 194 passes through the gripper assembly 130 and the base plate 182 to allow a vacuum to be formed within the gripper assembly through a vacuum port 198. The gripper assembly 130 is configured to be coupled with the tool center attachment on the robotic arm 124 by means of the tool center attachment point 188. The gripper assembly may be connected to the robotic arm by means of the swivel adapter 184 to allow the gripper assembly to be rotated independent of the vacuum port. This alternative allows rotational movement of the gripper assembly and the work piece 114 being manipulated without movement of the vacuum hose 136 or other control lines, thus reducing wear and materials fatigue.

The gripper hood membrane 192 is made of a soft material such as silicone or soft thermoplastic blend that enables it to conform to the irregular surface of the work piece 114 close enough so the laws of aerodynamics and airflow will generate sufficient drawing force that the vacuum (low pressure) will bring the inner surface of the lip 190 to attach firmly but gently to the surface of the work piece. By this means the initial leakage gap (before vacuum flow is applied) between the two joining surfaces will close, so an air pressure difference between the works piece's encapsulated surface and the lip will be generated. To avoid unpredictable and non-causal (chaotic) deformations of the membrane 192 as the low-pressure builds up inside the gripper, it is preferred that the horizontal curvature of the membrane is defined by fulfilling the rule that the derivative d(f(theta, z)/d(theta), where f is the horizontal curvature of the membrane; theta is the angle of rotation around the vertical rotation axis is monotone, and the derivative d(f(theta, z)/d(z) is a continuous function familiar with one period of a cosine shape, as z=0 at the top and points downward, known as an S-shape function.

The area projected to the normal plane of motion trajectory of the robotic arm 124 to which the gripper assembly 130 is attached, summed with the natural force of gravity, will define the proportional holding force of the gripper assembly. The profile shape of the gripper membrane 192 is preferably optimized to maximize this area, so the gripper holding capability is also optimized. This principle has been adopted from the shape of the jellyfish, and the suction cavity of the octopus.

As depicted in FIGS. 3A and 4, small, flexible vacuum channel tubes or fingers 200 with open ends protrude through channels 204 formed in the gripping hood 130. The vacuum channel fingers may be integrally molded into the gripper hood, or may be formed as separate individual channels and connected to the hood or the base plate 182. In the embodiment depicted in FIG. 4, a bottom base plate assembly 208 is connected to the base plate 182; this bottom base plate assembly typically "floats" in the interior of the gripper hood, and is useful to distribute vacuum force first to the interior of the membrane, and then to the fingers 200.

Suction is generated by the vacuum pump 134 at the central orifice 194 at the top of the hood 180 and also through the flexible vacuum channel fingers 200 to provide a gripping force at multiple points closer to the edge of the gripper assembly 130. In food-related applications, the vacuum fingers may be removed after molding leaving the channels 204 open, but sufficiently rigid so as not to collapse when a high vacuum level is generated. Nubs 214 may be added to, or molded into, the gripper assembly between the channels 204 to protect against collapse and closure under a high vacuum level. This reduces the delamination risk between the fingers 200 and the membrane 192 and the concomitant possibility of dropping the work piece during processing.

Airflow is initially introduced around the lip 190 of the base plate 182. There is typically little or no airflow until lip is positioned over the work piece 114. With the vacuum pump 134 or other source capable of producing up to an 80% vacuum, a sufficient vacuum level to provide an initial grip of the work piece can be created in about 1/10 of one second. This creates a sudden shock on the work piece and lip 190 of the gripper assembly 130. Within about 5/100 of one second the work piece is trapped against the lip of the base plate.

At that point, the air flow around the base plate 182 is blocked by the work piece 114 abutting against the base plate, and thus the suction air flow passes through the vacuum channel fingers 200. This causes the gripper membrane 192, being formed of flexible material, to deform to the general shape of the work piece. This typically produces a tight connection at multiple points on the work piece, due to the drag generated by the high vacuum airflow, in accordance with the same principles of fluid dynamics that apply to the wings of aircraft.

Evacuating air from a closed volume develops a pressure difference between the closed volume and the surrounding atmosphere. If this closed volume is bound by the surface of the hood membrane 192 and a work piece 114, atmospheric pressure will press the two objects together. The amount of holding force depends on the surface area shared by the two objects and the vacuum level. In an industrial vacuum system, a vacuum pump or generator removes air from a system to create a pressure differential.

Because it is difficult if not impossible to remove all the air molecules from a container, a perfect vacuum cannot be achieved. Hence, as more air is removed per unit of time, the pressure difference increases, and the potential vacuum force becomes greater. In the non-ideal working conditions of a typical real-world application, the volume speed (in liters/second) will be the determining factor for both the desired ultra-short time raise in vacuum level and the actual holding vacuum if any significant leakage between the suction cup and the specimen exists. In this situation the vacuum level $\Delta p$ is determined by the aerodynamic analogue of Ohm's law:

$$\Delta p = R \cdot \frac{dV}{dt}$$

where $\frac{dV}{dt}$ is the volume pumping speed, and R the total aerodynamic resistance in the vacuum system. Preferably, R is minimized by choosing vacuum parts, connections, and fingers of an appropriate size. In the apparatus 100, the resistance to flow should be minimized, as all parts of the invention are typically to evacuation. Any fraction of the encapsulated vacuum holds a partial vacuum that represents a resistance to flow and equates with a negative gauge pressure. For the ideal vacuum cup the holding force is defined by:

$$F_{tot} = (P_{atm} - P_{vac}) \cdot A_{cup}$$

Where:
  $P_{atm}$=Atmospheric pressure (Pa)
  $P_{vac}$=Vacuum pressure (Pa)
  $A_C$=Vacuum cup area (m$^2$)

For example, a volume of 0.3 m$^2$ with a vacuum level of 0.4 bar (40000 Pa) gives 1.2 kN or 120 Kg not accelerated by robotic motion; or 30 kg assuming the 4G acceleration typical of a high speed industrial robot, not applying any safety margin factors.

Due to the highly dynamic and chaotic behavior of a loosely packed bag of objects, considerations are made regarding the ranges of resultant forces necessary to achieve high speed, high acceleration handling of the specimen by the robot. When the work piece 114 contains a liquid substance, special caution is taken to ascertain correct placement (using computer vision technology) and reliable bag material properties. These determinations are specific to the situation, but may be resolved by methods known in the art. The required vacuum force may be determined in both the vertical and horizontal axes and readily applied to SCARA (Selective Compliant Assembly Robot Arm) robotic configurations with parallel axis construction, which are generally faster and cleaner than comparable Cartesian systems requiring a smaller footprint and providing for simpler mounting. In the articulated robot instance a dynamic vector determination is performed to ensure that rotations away from horizontal, and rapid change of placement orientation are taken into account.

In lifting a work piece 114, the vertical force requirement may be defined by:

$$F = M(a_{lift} + a_g) \cdot \text{SafetyFactor}$$

Where:
  $a_{lift}$=lift acceleration
  $a_g$=acceleration due to gravity
  Safety Factor usually=4 for horizontal lifts Similarly, the horizontal force requirement may be defined by:

$$\vec{F} = M \cdot \vec{a} \cdot \text{SafetyFactor}$$

Where $\vec{a}$ includes of both linear acceleration components and centrifugal contributions originating from all rotations from all vertical robot axes. A safety factor of two is generally applied for horizontal displacements. The dry friction may be given by:

$$\lambda_{dry} = \mu_{dry} \cdot A_{cup}$$

Furthermore the coefficient of friction $\mu_{dry}$ is a complex of both dynamic and static friction behavior, normally with a maximum when the velocity difference between the gripper and the object equals zero. Because the dry friction $\lambda_{dry}$ is practically limited in real-world applications, a safety multiplication factor is indicated. These factor levels are empiric or experimentally derived by vendors of commercial suction cups, and based on a rigid work piece, which geometrically matches the interface surface of the attaching surface of the suction cup.

For work pieces 114 having touching surfaces that do not closely conform to the interior surface of the hood 180, the basic vacuum lift formula typically does not provide a usable model, and empirical safety factors must be applied, leading to vacuum demands that are not practically achievable. Such scenarios are found in the field of natural products, both food and non-food. Also bag pre-packed goods, such as a potato pillow bag, are purely defined to suit the basic vacuum lift principle and formula. The variety of shapes of such pre-packed bags is theoretically very large if not infinite.

Grasping pre-packed goods in over-sized bags applying the basic vacuum suction cup principle introduces a more difficult challenge in relation to robotic handling. The force applied to the bag due to the acceleration of the gripping assembly 130 by the robotic arm 124 may significantly exceed the acceleration due to gravity. Due to high basal capacity needs in handling processes in these areas—the value of which is based on their speed as it directly relates to the user's return on investment—the apparatus 100 should be designed with a central focus on processing speed. That means utilizing the maximum range of accelerations possible with due respect to strength of bags and the danger of damaging the work pieces packed. The apparatus provides this required degree of acceleration and speed capability to generate a high return on investment from using robotic appliances equipped with the gripping assembly.

An alternative to avoid the pitfalls of many packaging schemes is to use vacuum packaging. While this may prevent the packaged goods from tumbling against each other and may assist in retaining proper alignment, but it also leads to high total costs and slower operation. The apparatus 100 allows a similar of precision in handling without the inconvenience and additional cost inherent in the vacuum packaging approach. The need to handle work pieces 114 comprising a loose bag containing a plurality of goods, which is a common real-world application (for instance, bagged potatoes), has created a need for compatible grasping metrology and devices, which need is addressed by the apparatus.

In certain working environments, the work piece 114 must be picked up from a horizontal work space or conveyor and hung vertically on a hook or cone, such as poultry breasts or full body chickens. In such cases, re-orientation from horizontal to vertical must be performed by the robotic arm 124. In a conventional configuration where the robotic arm is suspended vertically, this often requires manipulation in at least five axes.

Figure 5:
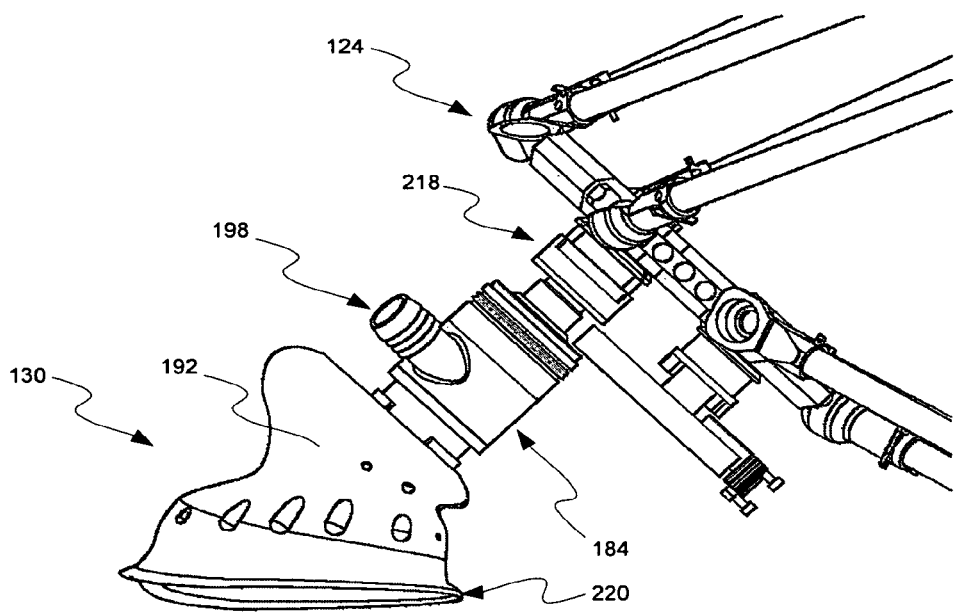
FIG. 5 depicts a side view of a robotic arm holding the gripping assembly at zero degrees of rotation.
Figure 5A:
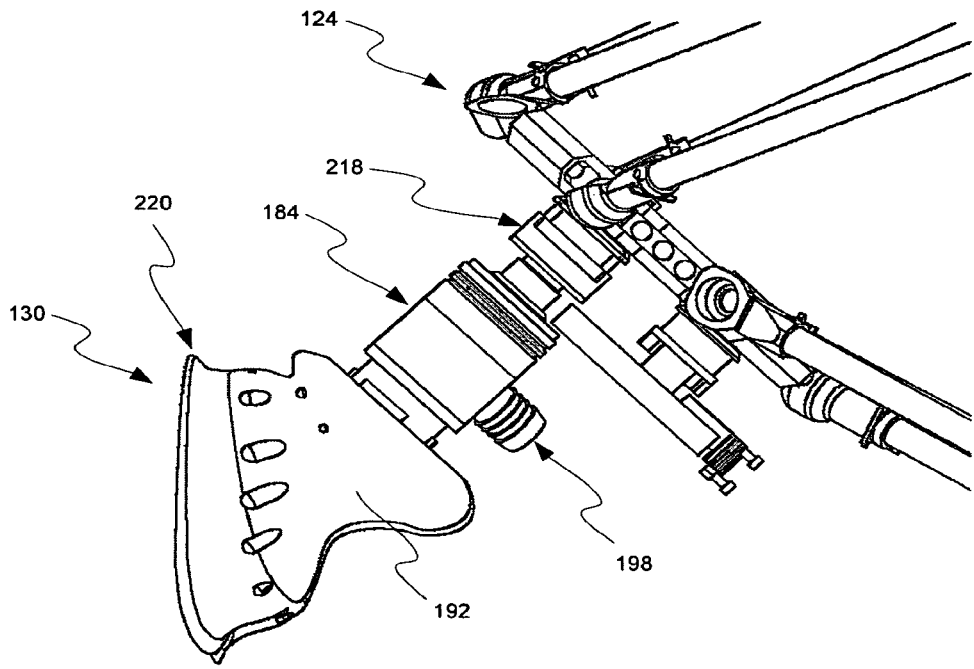
FIG. 5A depicts a side view of the robotic arm holding the gripping assembly at 180 degrees of rotation.

As depicted in FIGS. 5 and 5A, the apparatus 100 provides an alternate approach. The robotic arm 124 may be suspended at a 45 degree angle from vertical, and the gripper assembly 130 may be mounted on a 45 degree tilt between the attachment face 218 and the rim 220 of the membrane 192. This has the advantage of offering a horizontal to vertical reorientation by simply rotating the gripper assembly 130 degrees using the swivel adapter 184. The resulting design provides horizontal-to-vertical re-orientation using a less complex and less expensive robotic arm that is designed to manipulate in only four axes. FIG. 5 depicts the gripper assembly 130 with the axis of the gripper assembly at a 45 degree angle between horizontal and vertical, and the gripper assembly rotated to a 0 degree rotation, thereby positioning the gripper assembly for a horizontal pickup or release of the work piece 114. FIG. 5A depicts the gripper assembly 130 rotated to a 180 degree rotation, thereby positioning the gripper assembly for a vertical pickup or release of the work piece 114, without changing the orientation of the robotic arm 124 from the horizontal pick-up position depicted in FIG. 5.

Figure 6:
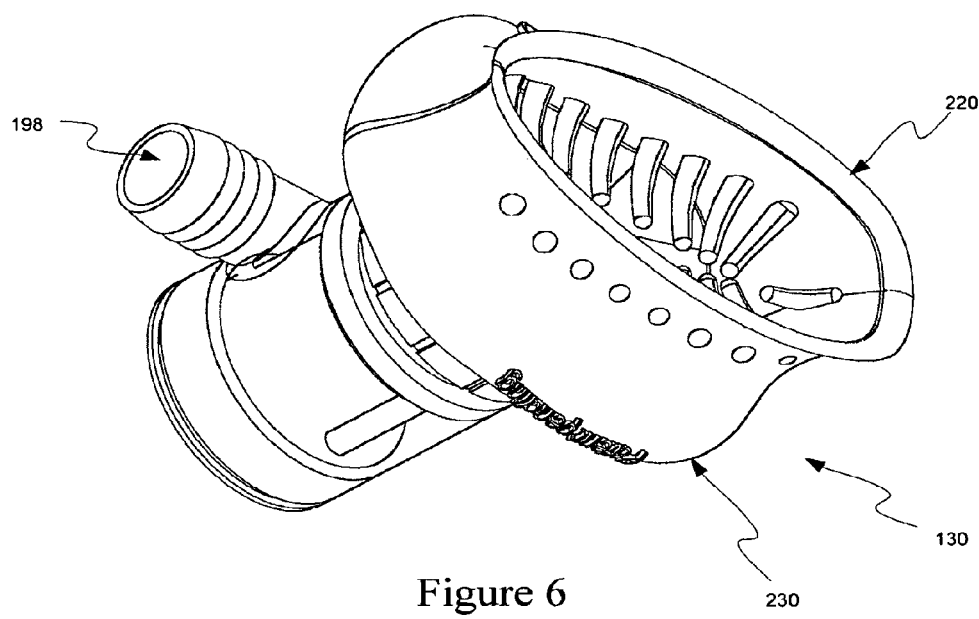
FIG. 6 depicts a perspective of an alternative embodiment of the gripper assembly.
Figure 6A:
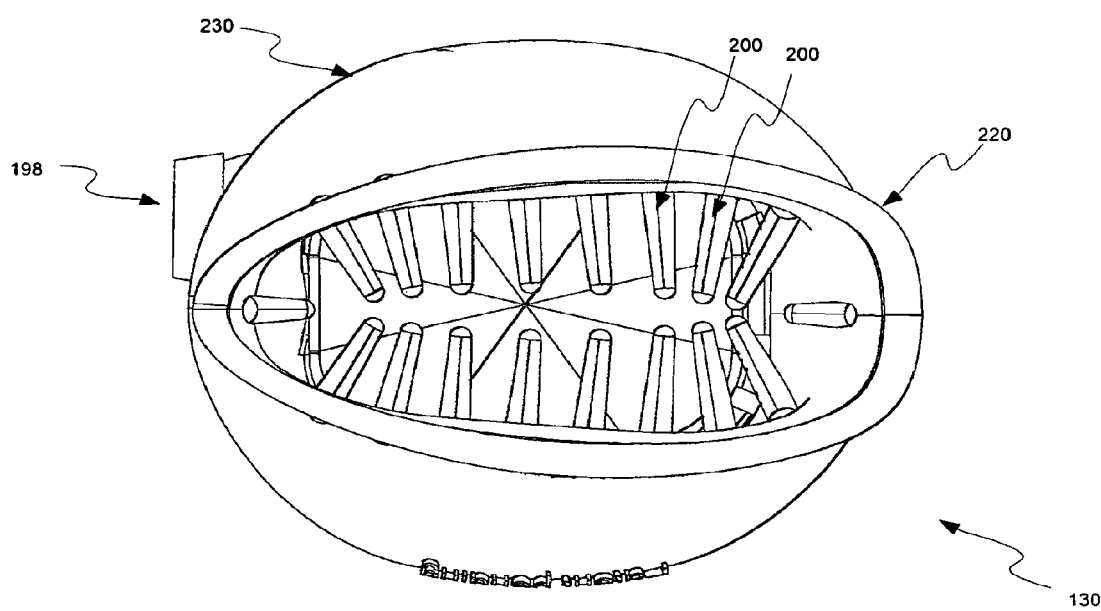
FIG. 6A depicts a bottom view of the alternative gripper design of FIG. 6.

As depicted in FIGS. 6 and 6A, the gripper hood 130 may be designed with the vacuum fingers 200 extending significantly into the interior of the hood. According to this embodiment, the hood includes a side hip 230 and has a rim 220 size that is too small to expand to cover the entire work piece 114 to be packed. The result is that when a vacuum force is applied to the interior of the hood and the rim comes into contact with the work piece, and the hood deforms about the work piece, creating a deformation similar if not equivalent to that of larger membranes. The vacuum fingers are then in a position to grip the work piece to assist in lifting. This design may also reduce the risk of loose skin or bag foil, or other such material, getting trapped inside the gripper assembly 130 and thereby producing complex release scenarios.

While the primary purpose of the apparatus 100 concerns generation of lift and holding force to a work piece 114 for spatial handling by robotic manipulation, in principle, the method can be carried out by a live operator controlling the stages of the grasping method. Alternatively, a combination of operator control and automatic control is possible.

To be able to track and store lifetime data from a gripper assembly 130, an RFID (Radio Frequency Identification) chip may be attached to or molded directly into the gripper assembly or the robotic arm 124. This RFID tag may be either of the passive or active type, as known in the art, and may also be used to ensure and inform the operator that the right gripper assembly for the job is attached, in cases where one piece of equipment is configured to use multiple different grippers for different types of handling or packaging jobs.

The gripper assembly 130 may be also be equipped with a color kinematic transducer that uses sensor feedback sensing the immediate vacuum level and converting the measurement of that level into a electrical signal. This signal may then drive a multi-color LED (light emitting diode), OLED (organic light emitting diode), or an illuminating polymer. With this type of optical feed-back system in place, the installation, service or operating staff may observe the immediate vacuum level (grasping force) of the gripper assembly, and apply this visual feedback to system optimization, troubleshooting procedures, or other purposes.

The human eye and the human visual interpretation speed is typically superior to other measurement systems, such as reading a digital numeric display. As the range of speed used by robotic packaging systems and related applications is relatively high, color kinematic feedback provides immediate monitoring capability that surpasses typical conventional displays. Also the fact that the LED feedback originates from the gripper assembly 130 or from the swivel adaptor 184 allows the indicator and the actual action of the gripper to be observed simultaneously.

The described embodiments are suited to grasp and release challenging irregular objects, but the principles are valid also for simple or rigid objects as well. The types of work pieces 114 that can be effectively grasped and transported by the gripper assembly 130 include a wide variety of packaged objects such as bagged fruits and vegetables, bags containing discrete items such as candy, coal, or charcoal briquettes, granulated products in bags, and even raw or processed poultry, fish or cuts of meat. The apparatus 100 also allows handling, at high speed and acceleration, even of relatively heavy work pieces, often limited only by the tear strength of the lip 220 and the rigidity of the tool part and manipulator. The gripper assembly has been successfully tested with goods weighing up to 15 kilograms, but the practical limit presently appears to be significantly higher.

The apparatus 100 may be used for work pieces 114 including loosely bagged materials, but the essential design applies to similar but geometrically different work pieces. Thus, the present invention has several advantages over the prior art. It will be obvious to those of skill in the art that the invention described in this specification and depicted in the FIGURES may be modified to produce different embodiments of the present invention. Although embodiments of the invention have been illustrated and described, various modifications and changes may be made by those skilled in the art without departing from the spirit and scope of the invention.

The invention claimed is:

1. A gripper having a flexible gripping hood that includes a base and a plurality of channels,
    wherein the base is formed about a first central orifice and has a predetermined circumference surrounded by a flexible lip that extends around the circumference of the base and extends downwardly to a circumferential rim, the plurality of channels passing radially outwardly from the first central orifice and down the lip to a predetermined distance from the rim, the lip and rim being adaptable to conform to a work-piece when a pressure differential between the hood and the work-piece is created;
    wherein a lip base is mounted to the base of the hood and has a second central orifice; and
    wherein a vacuum line passes through the first and second central orifices;
    the gripper further comprising a plurality of channel fingers each having a proximal and a distal end, each finger being affixed to the gripping hood by mounting in a respective one of the channels;
    whereby upon application, a vacuum force is initially applied through the first orifice, causing portions of the work-piece to move toward the first orifice, after which the vacuum force is directed along the fingers, thereby enabling suction gripping at a plurality of points proximate the rim of the gripping hood and causing the hood to deform about, and conform to, a surface of a work-piece.

2. The gripper of claim 1 wherein the hood extends downwardly to a circumferential rim according to a generally cosine-shaped curve that produces a predetermined deformation profile.

3. The gripper of claim 1 wherein each of the channels is separated from adjacent channels by a protuberance.

4. The gripper of claim 1 wherein the fingers are integrally molded into the hood channels.

5. The gripper of claim 1 further comprising a bottom plate connected to the lip base and floating inside the circumference of the hood.

6. The gripper of claim 1 further comprising an obstacle formed into the lip base to prevent loose portions of the work-piece from filling the first orifice.

7. A vacuum gripping apparatus comprising a gripper according to claim 1, a robotic arm having a tool center point to which the gripper is connected, and at least one vacuum hose in communication with the proximal ends of the fingers through the first and second orifices and connected to a vacuum source and adapted to provide a suction force inside the gripping hood proximate the first central orifice and to provide a suction force through the vacuum hose to the distal ends of the fingers, thereby enabling suction gripping at a plurality of points proximate the rim of the gripping hood.

8. The apparatus of claim 7 further comprising a real-time computerized controller for the robotic arm that incorporates feedback to position the gripper adjacent the work-piece to be gripped.

9. The apparatus of claim 7 further comprising a swivel adaptor mounted between the robotic arm and the gripper to enable rotation of the gripper about a predetermined axis without rotation of the vacuum hose.

10. The apparatus of claim 7 further comprising a sensor to monitor the vacuum force and to respond if the holding force falls below a predetermined level.

11. The apparatus of claim 7 further comprising a valve to control the level of vacuum force in the vacuum hose.

12. The apparatus of claim 7 and suited to grasp and release irregular objects, the gripper hood being
a unitary flexible gripping hood that includes the base formed about a first central orifice and having a circumference of a predetermined shape surrounded by the lip that extends around the circumference of the base and extends downwardly to a circumferential rim according to a generally cosine-shaped curve that produces a predetermined deformation profile, the plurality of channels being formed into the hood, the lip being sufficiently flexible that the lip and rim are adaptable to conform to an irregularly shaped work-piece when a pressure differential between the hood and the work-piece is created, each of the channels being separated from adjacent channels by a protuberance;
the plurality of channel fingers being flexible hollow tubular vacuum channel fingers;
the robotic arm controllable by a real-time computerized controller incorporating tactile and visual feedback to position the gripper adjacent the work-piece to be gripped;
the at least one vacuum hose having a first and a second end, the first end in communication with the proximal ends of the fingers through the first and second orifices, the second end connected to the vacuum source, whereby upon initial application of a suction the majority of the vacuum force is applied through the first orifice, causing the portions of the work-piece to move toward the first orifice, whereupon the vacuum force is directed through the fingers;
the apparatus further comprising an electronically operated high speed and high vacuum flow valve to control the level of suction in the vacuum hose;
an optical system to provide robotic arm position information, the optical system comprising:
a plurality of light emitting diodes to illuminate the work-piece;
a plurality of segmented rings of mirrors that reflect light from the light emitting diodes to provide homogeneous illumination of the work-piece;
a camera having an objective lens for recording predetermined image information of the work-piece;
memory to store images captured by the camera;
wherein the light emitting diodes illuminate the work-piece through the mirrors to permit the camera to take an image of the work-piece, following which geometric features of the irregular work-piece are extracted from the image and compared to a predefined geometrical model having similar features and a predetermined gripping offset position, whereby the robotic arm is oriented generally to align the gripper with respect to the predetermined offset position; and
a sensor to signal to the controller that a safe holding force has been achieved by the suction force and furthermore to monitor the holding force and to respond if the holding force falls below a predetermined level.

13. The apparatus of claim 7 further comprising an optical system comprising:
a light source to illuminate the work-piece;
at least one segmented ring of mirrors to reflect light from the light source and to illuminate the work-piece; and
a camera having an objective lens for recording predetermined image information of the work-piece.

14. The apparatus of claim 13 in which the mirrors form a static array of concentric mirrors.

15. The apparatus of claim 13 in which the light is reflected by the mirrors to strike the work-piece at a steep angle to avoid reflections and maximize contrast.

16. The apparatus of claim 13 wherein the light source illuminates the work-piece to permit the camera to take an image of the work-piece, following which geometric features of the work-piece are extracted from the image and compared to a predefined geometrical model having similar features and a predetermined gripping offset position, whereby the robotic arm is oriented generally to align the gripper with respect to the predetermined offset position.

* * * * *